United States Patent
Wang et al.

(10) Patent No.: US 6,908,148 B2
(45) Date of Patent: Jun. 21, 2005

(54) SUN SHELTER FOR CHILD CAR SEAT (76) Inventors: Sonny S. Wang, 963 Coventry Cir., Milpitas, CA (US) 95035; Kelly C. Tang, 963 Coventry Cir., Milpitas, CA (US) 95035

( * ) Notice: Subject to any disclaimer, the term of this patent is extended or adjusted under 35 U.S.C. 154(b) by 0 days.

(21) Appl. No.: 10/831,708

(22) Filed: Apr. 23, 2004

(65) Prior Publication Data
US 2004/0245812 A1 Dec. 9, 2004

Related U.S. Application Data (63) Continuation-in-part of application No. 10/455,870, filed on Jun. 6, 2003, now abandoned.

(51) Int. Cl.$^7$ ............................................. A47C 7/66
(52) U.S. Cl. ........................ 297/184.13; 297/184.14; 297/184.15; 297/184.11
(58) Field of Search .................... 297/104.1, 184.11, 297/184.12, 184.13, 184.14, 184.15

(56) References Cited

U.S. PATENT DOCUMENTS

| | | | |
|---|---|---|---|
| 4,579,385 A | * | 4/1986 | Koenig .................. 297/184.12 |
| 4,583,779 A | * | 4/1986 | Myers .................... 297/184.13 |
| 4,923,249 A | * | 5/1990 | Mattox ................... 297/184.13 |
| 5,154,473 A | * | 10/1992 | Joranco .................. 297/184.15 |
| 5,309,586 A | * | 5/1994 | Sies et al. .............. 297/184.13 |
| 5,522,639 A | * | 6/1996 | Jaime .................... 297/184.11 |
| 5,538,319 A | * | 7/1996 | DiMurro ................ 297/184.13 |
| 5,542,732 A | * | 8/1996 | Pollman ................ 297/184.13 |
| 6,036,261 A | * | 3/2000 | Woods et al. .......... 297/184.13 |
| 6,263,894 B1 | * | 7/2001 | LaMantia .............. 297/184.13 |

* cited by examiner

Primary Examiner—Peter R. Brown
(74) Attorney, Agent, or Firm—Donald W. Meeker (57) ABSTRACT

A collapsible sunshade shelter encloses a child safety seat. A pair of side walls each have a side shade fabric attached to a frame perimeter and a top shade fabric between the frames. The frames each comprise a flexible tension member normally in a frame configuration but adapted for collapsing by twisting and folding into concentric smaller frames. A tie pulls in the front bottom edges while stretching out the top edges of the frames. Inwardly angled back extensions of the side frames are pushed inward by the vehicle seatback to push out the top front frame edges. A top frame may be inserted between the side panels to maintain the panels apart. A front shade panel may be attached by zippers or hook and loop fasteners. Loop-type fabric around the frames receive hook patches from the front panel to hold it open in any desired position.

22 Claims, 8 Drawing Sheets

SUN SHELTER FOR CHILD CAR SEAT

REFERENCES TO PRIOR PATENT APPLICATIONS

This is a continuation-in-part of patent application Ser. No. 10/455,870 filed on Jun. 6, 2003 now abandoned.

BACKGROUND OF THE INVENTION

1. Field of the Invention

The present invention relates to the field of sunshades used in conjunction with child safety seats in vehicles and in particular to a collapsible sunshade that forms an enclosure around the child safety seat.

2. Description of the Prior Art

Baby strollers, cribs, car seats, and other like devices (collectively, "child seats") are often used in areas subject to sunlight. It is important that a child be protected from the sunlight and not exposed to harmful UV rays. Additionally, a child exposed to sunlight may become over-heated which is uncomfortable and may be dangerous in extreme conditions.

Several previous child seat devices have included retractable canopies and other more intricate mechanisms that have a variety of moving parts. These moving parts and intricate mechanisms are difficult to protect, or make "child-proof" because they must interrelate or mesh together to effectively operative. Making them safe for a child often requires the device be effectively disabled thereby taking away their utility. These mechanisms also add a large amount of bulk to the seat adding weight that makes them more difficult to carry and requiring more storage space when not in use.

U.S. Pat. No. 5,067,770, issued Nov. 26, 1991 to Hassell, Jr., describes a sun shield for a child's car seat. The sun shield consists of a single flat piece of pre-cut firm bendable material that has a roof segment, a pair of side visor segments, a pair of support flap segments and a back segment, with a cut out gap area between each support flap segment and the back segment. The sun shield also comprises a plurality of machine-made fold lines, each located between all the segments and adhesive for securing the support flap segments to the rear surface of the back segment when the bendable material is folded up along all the fold lines to form said sun shield. The back segment can be adjustably placed between the backrest of the car seat and a seat back of a rear seat of an automobile with the roof segment extending over the head of the child to protect the head from rays of the sun entering through the windows of the automobile. The sun shield will not obstruct the rear view mirror for the driver of the automobile.

U.S. Pat. No. 5,975,558, issued Nov. 2, 1999 to Sittu, indicates an adjustable shade that is used in combination with a stroller, which carries a child occupant. The stroller has an integral canopy, and the adjustable shade includes a top cover that is configured to attach to the integral canopy. A front curtain is coupled to the top cover and extends downward from a front edge of the top cover. First and second side curtains are coupled to the top cover and extend downward from first and second lateral edges of the top cover. Adjustable shade adjusts to a plurality of positions to effectively protect the child occupant from lateral and reflected rays of sunlight.

U.S. Pat. No. 6,296,004, issued Oct. 2, 2001 to Gordon, shows a sun shield capable of protecting persons or plants against the harmful effects of incident radiation. The sun shield is formed from a substantially transparent flexible material which at least substantially absorbs and/or reflects incident radiation in the ultraviolet and infrared frequency ranges and which may be repeatedly folded without becoming damaged. The supple, flexible and durable transparent material may be mounted on a framework to be attached to, for example, a child's car seat or push-chair or to serve as a parasol or canopy, or to protect plants from excessive ultraviolet or infrared radiation.

U.S. Pat. No. D289,473, issued Apr. 28, 1987 to Myers, shows the ornamental design for a sun visor for child's car seat.

U.S. Pat. No. 1,339,527, issued May 11, 1920 to Sperling, indicates a collapsible screen for a baby carriage. The device is made from a metallic screen that allows it to hold its shape or collapse as needed. The screen may be folded, rolled up and placed in any convenient storage area, or carried in the baby carriage as desired.

U.S. Pat. No. 4,583,779, issued Apr. 22, 1986 to Myers, claims a sunshade for an infant's car seat that has a flexible, sheet-like canopy, which is generally horizontal in use. The canopy has a pocket formed at a first end for fitting over the top of the back of an infant's car seat. There is a flexible tension link at a second end of the canopy for stretchably anchoring the canopy to a part of the car's interior that is spaced-apart from the infant's car seat. There may be a pair of side flaps extending along opposite sides of the canopy between the ends thereof.

U.S. Pat. No. D426,091, issued Jun. 6, 2000 to White, claims the ornamental design for an infant car seat sun cover.

U.S. Pat. No. D375,423, issued Nov. 12, 1996 to Lapointe, puts forth the ornamental design for a car seat visor.

U.S. Pat. No. 5,553,914, issued Sep. 10, 1996 to Holladay, concerns a toddler car seat shade that comprises an inverted U-shaped frame member, which has downwardly extending vertical legs and an arcuate upper extent. The vertical legs each have a plurality of positioning apertures therethrough and a coupling aperture at the upper extent of each leg. An elongated inverted C-shaped frame member is provided with apertures at its free internal ends. Pivot pins are positionable through the apertures of the elongated inverted C-shaped frame member and the coupling apertures of the inverted U-shaped frame member to effect the pivotal coupling therebetween. A plurality of intermediate C-shaped frame members of varying sizes with apertures at their free ends are secured to the pivot pins. A cloth is positionable over the inverted U-shaped frame member and the elongated C-shaped frame members with a hem in the cloth secured to the U-shaped frame member and the elongated C-shaped frame member.

U.S. Pat. No. 5,538,319, issued Jul. 23, 1996 to DiMurro, is for a sunshade for an infant car seat that has a generally U-shaped frame covered by a canopy. The frame extends horizontally forward over the car seat and is removably connected to the rear of the car seat by an attaching portion. The attaching portion rests upon a top edge of the car seat backrest and inter-fits with a ledge at the rear of the backrest to secure the frame to the car seat in a cantilever fashion. The canopy has a top and at least one side curtain extending downward from a lateral side of the top. In this configuration, the canopy cover serves to completely shield the infant occupant of the car seat from direct rays of sunlight. Optionally, the canopy has an envelope that receives the U-shaped frame structure, and is removable from the frame. An optional second envelope at the rear of the canopy is used to further secure the canopy to the frame and hold the canopy taut.

U.S. Pat. No. 5,301,999, issued Apr. 12, 1994 to Thompson, shows a lightweight storable sunshade for a child's car seat. The mounting bracket for the sunshade is rigidly mounted to the side of a child's car seat. An angle bracket has a first flange rotatably engaged with the mounting bracket and has a second flange that extends at approximately 90 degrees to the first flange. A first arm is rotatably mounted to the mounting bracket second flange. A second arm is rotatably mounted to the first arm and a third arm is rotatably mounted to the second arm, thus forming an extended linkage that supports a lightweight sunshield above and to one side of the car seat to shield a child from the rays of the sun. The sunshield is constructed of a tubular support frame that is constrained within a fire resistant cloth cover. The tubular support frame is elastically constrained within a pocket formed by the two sides of the cover. The cover may have pictures printed thereon to entertain the child being shielded from the sun's rays. The ends of the tubular support pass through holes in opposed sides of a shade support bracket. The support bracket is rotatably linked to the uppermost arm in the extended linkage of the sunshade assembly. The elements of the assembly are connected at rotatable joints that may be clamped by adjustment of hand nuts to fix the sun shield in a desired position.

U.S. Pat. No. 5,205,308, issued Apr. 27, 1993 to Kendall, claims an apparatus for protecting an infant in a forwardly facing infant's seat in a vehicle from direct exposure to sun rays. The apparatus comprises a generally horizontally forwardly extending frame having multiple sections, with pivot structure connecting adjacent sections, so that the sections extend above the infant's seat. The device also has a foldable canopy carried by the frame to extend protectively above the seat, and to be folded as the frame sections are relatively pivoted; and support structure connected with the frame and extending generally downwardly to in turn be supported rearwardly of the infant's seat.

U.S. Pat. No. 5,007,674, issued Apr. 16, 1991 to Franc, discloses an apparatus adapted for use in conjunction with an infant car seat or similar device. The apparatus is designed to provide a sunshade for an infant, the novel apparatus being of soft and flexible construction and being self-supporting and free of rigid structural components. U.S. Pat. No. 4,947,883, issued Aug. 14, 1990 to Mayo, indicates an infant sunshade apparatus that is formed with a malleable memory retentive elongate channel formed with a planar upper and lower surface. The upper surface of the channel includes a series of hook and loop fasteners securable to a head liner surface of an associated automobile. A plurality of vertically oriented transparent shades utilizing photochromic material to accommodate various intensity of sunlight are formed with axles extending upwardly and parallel to the shades and extending through the channel to accommodate deformation of the channel. Each lowermost edge of the channel is formed with a continuous conduit receiving a single continuous rope-like member therethrough to impose structural and geometric integrity to the shades. The rope-like member is formed with a loop at each end thereof for securement of a clip and tether line thereto for maintaining a desired orientation of the apparatus relative to an infant.

U.S. Pat. No. 4,923,249, issued May 8, 1990 to Mattox, puts forth a portable, foldable sunshade for use in protecting a person from exposure to the sun. The sun shielding side supports retain the sunshade above the head of a person who is seated in a chair. The side supports, positioned between the person and the side of the chair, are adjustable for shielding the person from oblique rays of the sun.

U.S. Pat. No. D339,258, issued Sep. 14, 1993 to Langenberg, concerns the ornamental design for a sunshade for an infant's car seat U.S. Pat. No. 4,784,433, issued Nov. 15, 1988 to Purnell-Ayres, illustrates an infant-protecting sunshade for use in a land vehicle such as an automobile with an infant car set or a stroller. The sunshade is a unitary member stamped in the shape of a flat mushroom from flat sheet rubber and bent at fold lines to form a hood. The hood has a back that is insertable for support behind an infant car seat, a forwardly foldable top, and first and second downward sides, foldable up and securable by hook and loop fastening over the top when not in use. Being flexible, either or both sides can, in tight quarters, be rolled up to pass an obstruction such as the inside wall of an automobile.

U.S. Pat. No. 4,733,906, issued Mar. 29, 1988 to Davis, provides a sunshade for infants, which is affixable to essentially all styles of car seats. The sunshade has a generally rectangular fabric shade that is supported by a generally U-shaped support bar made from a stiff, but bendable material. An elastic cord is affixed to the back and to a portion of each of the side edges and the shade is held in a generally horizontal position by the action of the support bar, the elastic cord and the fabric shade, itself.

U.S. Pat. No. 4,293,162, issued Oct. 6, 1981 to Pap, describes a sunshade for an infant seat. The sunshade includes a canopy that is adjustable vertically, horizontally and angularly with respect to the associated seat. The canopy has an adjustable arm-and-leg member, one end of the arm member being connected to the canopy frame structure by means of a universal socket bracket, and the opposite end thereof being adjustably attached to the leg member. The leg member is slidably adjustable within a support bracket attached to the seat, whereby the infant positioned within the seat can be shaded, whether the seat is placed in a seating position or in a lying position.

What is needed is a collapsible sun shelter which is easy to assemble and remove and inexpensive to manufacture and which permits easy access to the child in the seat with the sunshade shelter in place.

SUMMARY OF THE INVENTION

An object of the present invention is to provide a collapsible sun shelter for child safety seats in vehicles.

Another object of the present invention is to provide protection for a child in a car seat from the oblique rays of the sun, coming from any direction.

One more object of the present invention is to provide a collapsible sun shelter for child safety seat with bendable sides that permit easy access to the child in the seat with the sunshade shelter in place.

Still another object of the present invention is to provide a front panel which is removable or attached to shield the front of the child.

A further object of the present invention is to provide a zippered front panel with breathable screening to completely enclose the sun shelter to shield the child from the sun in all directions while still providing adequate ventilation for the child.

A related object of the present invention is to provide edge coverings on the side frames which have a loop-type fabric and strips of Velcro® on the bottom front corners of the front panel so that the front panel may be opened to provide any desired size of opening space by unzipping one or both sides of the front panel and attaching one or both corners of the front panel to any desired point along the side frames.

One more object of the present invention is to provide side panels which are closer together at the back than at the front and provide a top rear extension of the side panels adapted to engage the backrest of the vehicle seat behind the child safety seat so that the rear extension of the sun shelter rests against the vehicle seat backrest causing the two sides of the extension to bend inward, thereby causing the front of the flexible side panels to bend outward and maintain a maximum front opening with the top panel held flat in tension between the two side panels. Alternately in a shelter with evenly spaced side panels and no back extension a tension panel may be added to the top panel to maintain the side panels apart.

A corollary object of the present invention is to provide a tension cord between the two front bottom corners of the side panels which is tightened under the child safety seat to pull the bottom front corners of the side panels inward and thereby cause the top front corners of the side panels to bend outward and further tension the shelter to remain fully open.

An additional object of the present invention is to provide a collapsible sun shelter for child safety seat that has a low cost, simple structure, which is easy and inexpensive to manufacture.

A further object of the present invention is to provide a collapsible sun shelter for child safety seat that comprises lightweight, flexible spring wire frames covered with fabric that are easy to assemble or remove.

A contributory object of the present invention is to provide a collapsible sun shelter for child safety seat that does not obstruct the driver's ability to see the rear view.

An added object of the present invention is to provide a collapsible sun shelter for child safety seat that has a flexible nature, which allows children to get in and out of the child car seat or for parents to place a child into or remove a child from the child car seat with out removing the sunshade.

An ensuing object of the present invention is to provide a collapsible sun shelter for child safety seat that can also be used to shade an unoccupied car seat, thereby keeping the car seat from getting too hot.

In brief, a collapsible sun shelter for child safety seat that has a panel on each side with a spring wire frame covered with a fabric. The side panels are adapted for being collapsed by twisting and folding the flexible tension member into a plurality of concentric smaller frames to form a smaller unit for storing. The side panels are easily deployed, popping open for use. The side panels tie tightly together with tie string or elasticized cord or hook and loop fastener attachable strap at the bottom under the front of the child seat that causes a levering action to maintain panels apart at the top to form an enclosed shelter. A top shade fabric is attached to each of the frames along the top portion of the frame, part way down the front portion and also on the back portion of the frame so that the top shade fabric forms a roof for the shelter. An extra spring wire frame top panel may be inserted on top between the two side panels or attached to one side panel and movable into place between the two side panels to retain side panels apart. The top may be adjusted in width by tying a cord around the center of the panel to shorten it, or by loosening the cord to lengthen it or performing similar operations with a hook and loop fastener attachable strap or a cinched elasticized cord. The material on the collapsible sun shelter may be any sun shading fabric including a breathable mesh or a reflective fabric. An additional soft front panel may be attached by a mating hook and loop fastener or other means in one piece or two, like side doors, to completely enclose the shelter or a front half panel may be attached along a front edge of each of the two sides and the front half panels overlapped and interconnected by mating hook and loop fasteners or other fastening means.

A preferred zippered front panel with breathable screening zips up on both side edges adjacent to the side panels from the bottom of the front panel halfway across the top panel. The edge coverings on the side frames have a loop-type fabric and the zippered front panel has strips of Velcro® on the bottom front corners so that the front panel may be zipped open on one side and the bottom corner of the open side attached to the edge fabric on the top of the opposite side for a slanted half opening to shield the sun while still be able to have an open view of the child. Both sides of the front panel may be unzipped and the both corners attached to the side panel edging directly above to provide any desired size of opening space, including fully open with the front panel edges attached as far back as possible with the zippers fully opened.

The preferred embodiment also has side panels which are closer together at the back than at the front and provide a top rear extension of the side panels adapted to engage the backrest of the vehicle seat behind the child safety seat so that the rear extension of the sun shelter rests against the vehicle seat backrest causing the two sides of the extension to bend inward, thereby causing the front of the flexible side panels to bend outward and maintain a maximum front opening with the top shade fabric held flat in tension between the two side panels.

An advantage of the present invention is in being collapsible.

Another advantage of the present invention is that it is easy to assemble and remove.

A further advantage of the present invention is that the front panel may be fully closed or open to any desired extent for viewing the child while still providing shade, or fully opened to place the child in the seat or remove the child from the seat.

An additional advantage of the present invention is that it has means for tensioning the flexible metal loop edges and the fabric therebetween to maintain the shape of the shelter structure fully open with the fabric stretched tight.

One more additional advantage of the present invention is in being inexpensive to manufacture.

One more advantage of the present invention is in permitting easy access to the child in the seat.

Yet another advantage of the present invention is in being flexible.

Still another advantage of the present invention is that it does not obstruct the driver's view.

A further advantage of the present invention is in shielding a child from the sun's oblique rays in all directions.

Another advantage of the present invention is that it keeps the car seat from getting too hot.

Still another advantage of the present invention is in its ability to be of compact size for storage.

A final advantage of the present invention is that it is fun for children to sit in.

BRIEF DESCRIPTION OF THE DRAWING

These and other details of my invention will be described in connection with the accompanying drawings, which are furnished only by way of illustration and not in limitation of the invention, and in which drawings.

BEST MODE FOR CARRYING OUT THE INVENTION

In FIGS. 1–12, a sunshade shelter device 20 and 20A encloses child safety seat 30. The device 20 and 20A comprises a pair of side walls 26A and 26B adapted for being positioned on each of two sides of a child safety seat 30. The pair of side walls 26A and 26B each comprise a flexible tension member 21A and 21B, respectively, that forms a frame for each of the side walls 26A and 26B. The tension members 21A and 21B normally assume the frame configuration but are adapted for being collapsed by twisting and folding the flexible tension members into a plurality of concentric smaller frames to form a smaller unit for storing. The tension members 21A and 21B are further adapted for expanding open into the frame configuration upon release. The flexible tension members 21A and 21B comprise a wire loop, a plastic loop, or a spring metal loop or loop formed of other spring-like material.

Figure 2:
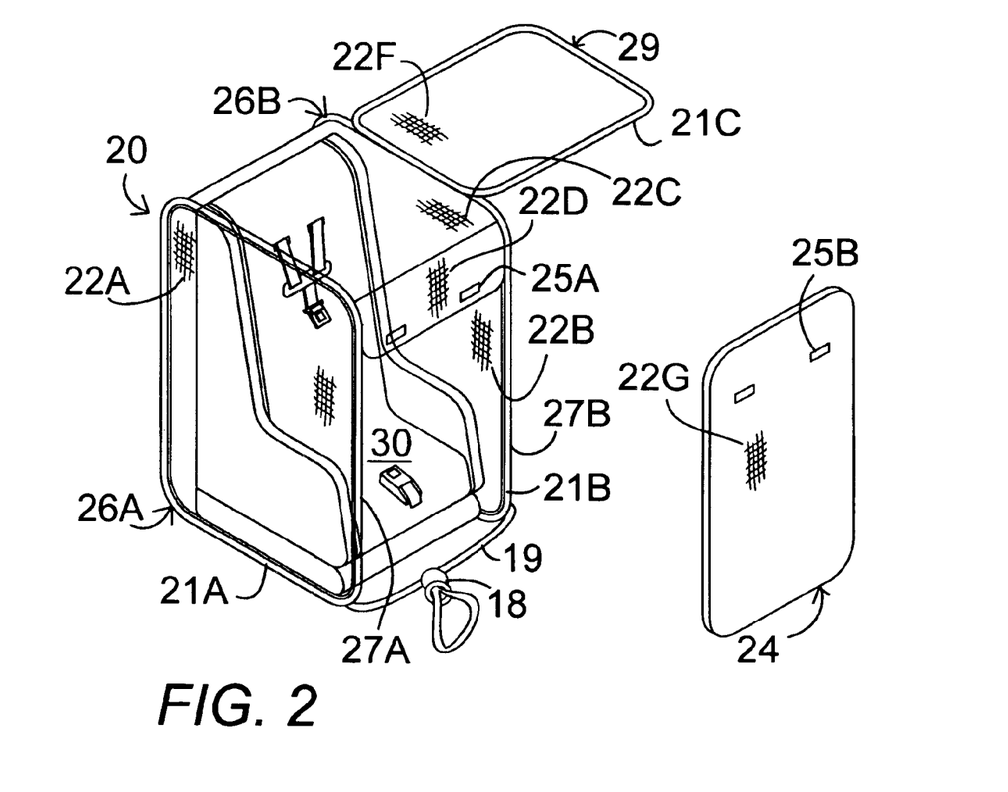
FIG. 2 is a perspective view of the sunshade shelter of FIG. 1 mounted on the child safety seat with a front screen panel that may be added to enclose the front of the shelter and a hinged top panel to strengthen the structure of the shelter and hold the side panels apart at the top of the sun shelter.

The side walls 26A and 26B are sufficiently flexible that they may be bent to install a child in and remove a child from the child safety seat 30 with the sunshade shelter 20 in place around the child safety seat 30, as shown in FIG. 2. The sunshade shelter device 20 also comprises a side shade fabric 22A and 22B attached to each of the frames 21A and 21B around the perimeter of the frame 21A and 21B so the fabric 22A and 22B covers the area inside of the frame 21A and 21B. The fabric may be attached by stitching or by an adhesive or other securing means. The fabric 22A and 22B is adapted for shading rays of sun so that the frame 21A and 21B and covering fabric 22A and 22B form a shade wall 26A and 26B on each side of the child safety seat 30.

The sunshade shelter device 20 further comprises a top shade fabric 22C attached to each of the frames 21A and 21B along a top portion of the frame 21A and 21B and part way down a front portion 22D and a back portion 22E of the frame 21A and 21B so that the top shade fabric 22C forms a roof for the shelter 20 between the two side panels.

Figure 1:
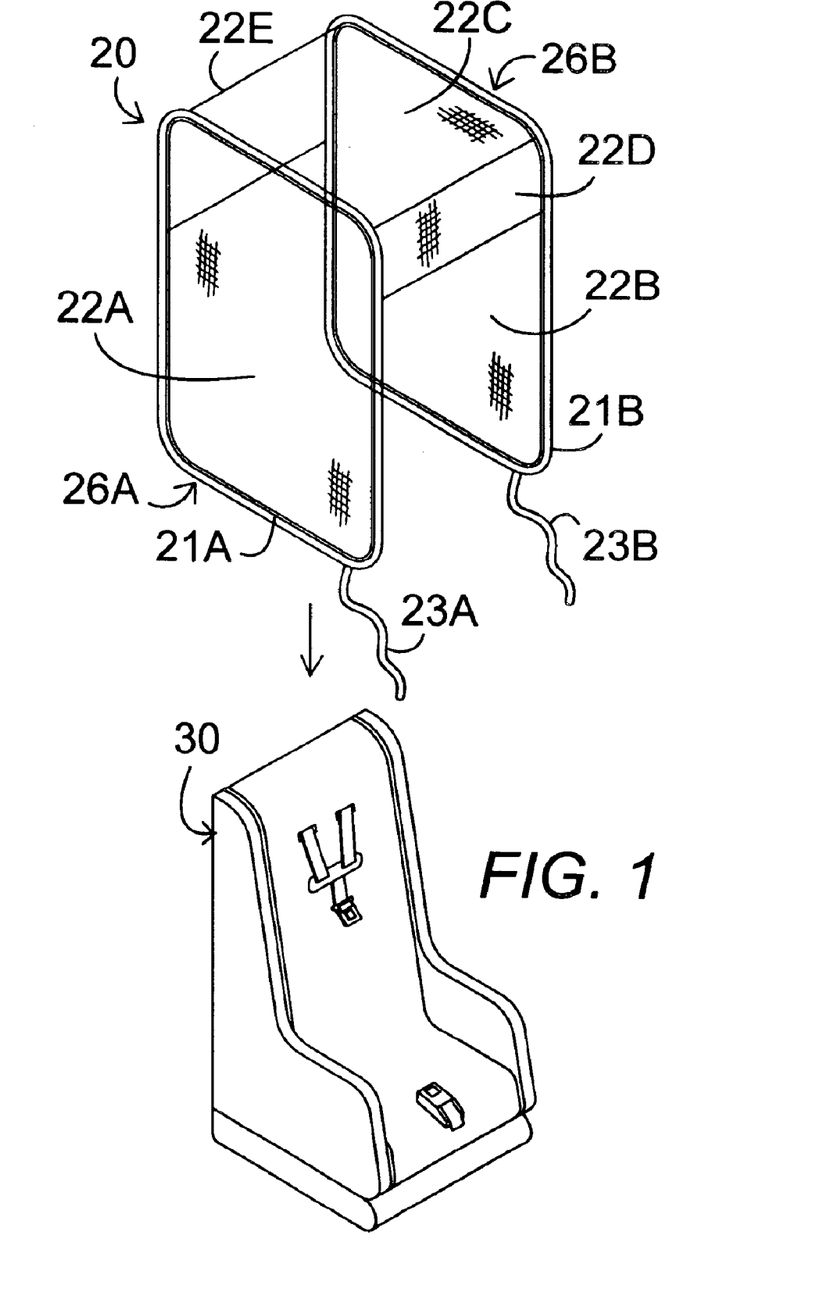
FIG. 1 is a perspective view of the sunshade shelter of the present invention shown above the child safety seat in a position to lower it down over the seat.

The sunshade shelter device 20 also comprises means for securing two bottom edges of the frames 21A and 21B tightly to the child safety seat 30 on each side of the child safety seat 30 by pulling in each of the bottom edges of the frames 21A and 21B. The top portions of the frames 21A and 21B tend to flex outwardly in response to the pulling inwardly at the bottom edges, thereby maintaining all of the shade fabric 22A–22E in a taut condition to maintain a sunshade shelter 20 around the child safety seat 30. The means for securing the two bottom edges of the frames 21A and 21B tight to the child safety seat 30 comprises an elongated element 19 or 23A and 23B attached between the two bottom edges of the frames 21A and 21B. The elongated element 19 or 23A and 23B comprises either a tie string 23A and 23B, as shown in FIGS. 1, 3 and 6, or an elasticized cord 19 with a binding element means, such as a rigid loop 18 which can be plastic or wood or other material formed in a ring, for tightening the tension on the elasticized cord 19 making the elasticized cord 19 adjustable in tension, or other means for pulling the two side walls together at the bottom, as shown in FIG. 2,.

The sunshade shelter device 20 further comprises a front shade fabric 24 (shown in FIG. 2) that is adapted for attaching to the front of the shelter device 20 to enclose the shelter device 20 completely around the top, front, sides, and exposed back portions of the child safety seat 30, as shown in FIG. 2. The front shade fabric 24 comprises a single sheet of flexible front shade fabric 22G attached to a front portion 22D of the top shade fabric 22C by a mating hook and loop fastener means 25A and 25B.

Figure 3:
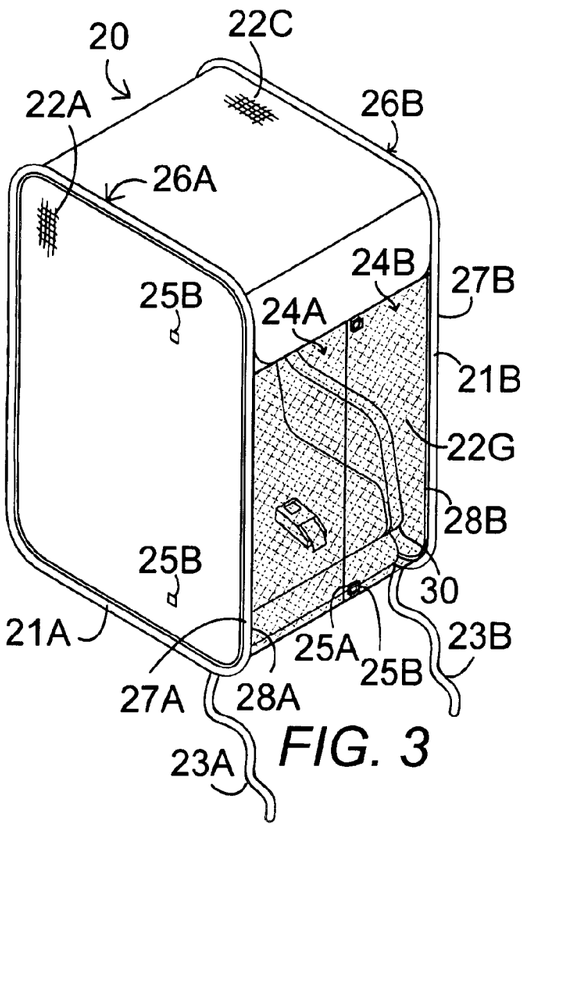
FIG. 3 is a perspective view of the sunshade shelter of FIG. 1 with attached front panels in a closed position.
Figure 4:
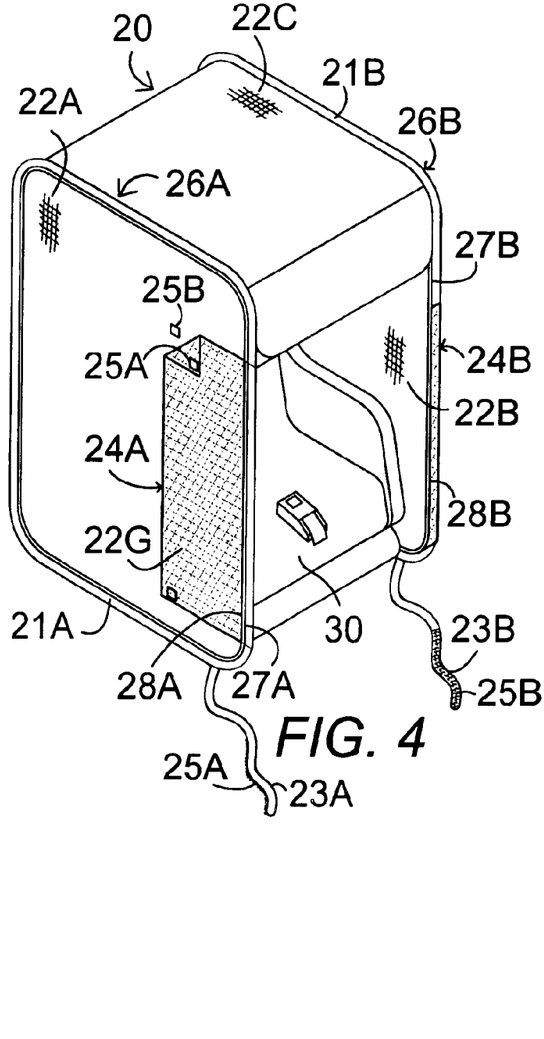
FIG. 4 is a perspective view of the sunshade shelter of FIG. 1 with attached front panels in an open position and showing a hook and loop fastener tie for across the bottom front of the shelter.

In another embodiment 24A and 24B, shown in FIGS. 3 and 4, the front shade fabric comprises two sheets of flexible front shade fabric 22G with one sheet 24A attached to a front side 27A of one of the side frames 21A and the other sheet 24B attached to a front side 27B of the other of the side frame 21B. The two sheets 24A and 24B are adapted for overlapping and being attached together to enclose the front of the shelter device 20, as shown in FIG. 3. The overlapping sheets 24A and 24B of the front shade fabric 22G are attached together by a mating hook and loop fastener means 25A and 25B. In FIG. 4, in the open position to two sheets 24A and 24B are adapted for being attached to the outside of the side panels with mating hook and loop fastener means 25A and 25B.

Figure 5:
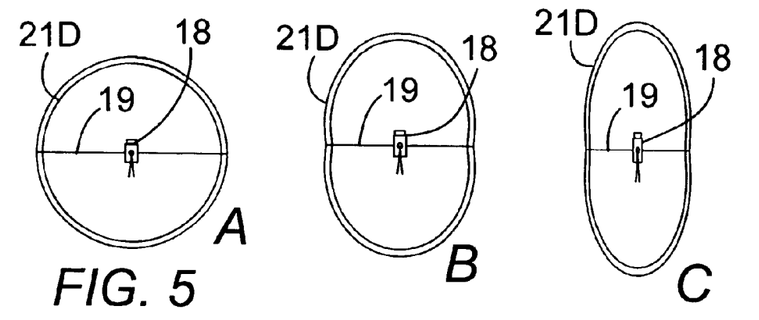
FIGS. 5A, 5B, and 5C show top plan views of an insertable top panel with an elasticized draw string to adjust the width of the panel as shown by the three different widths.
Figures 6, 6A:
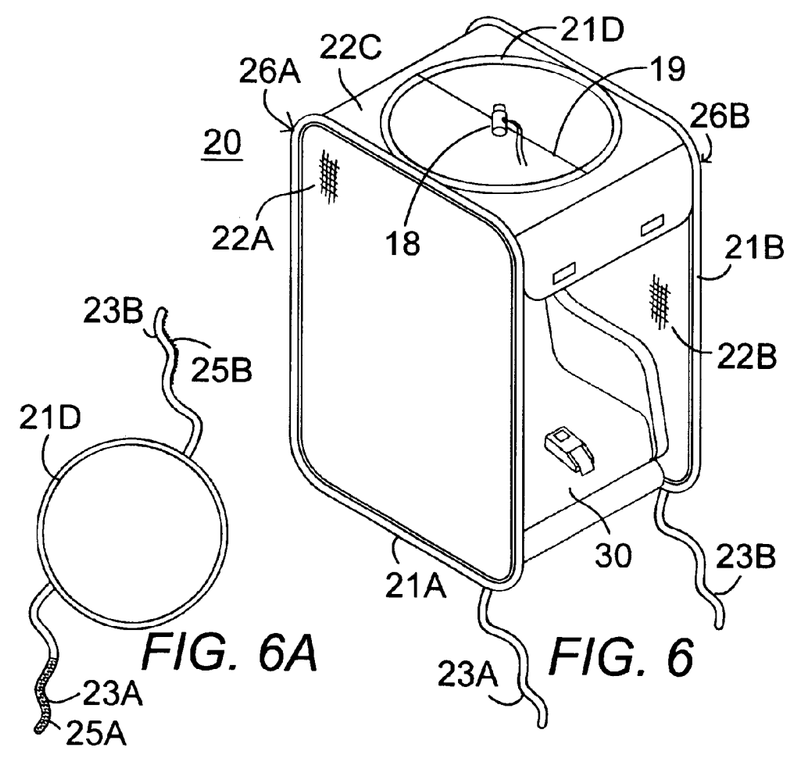
FIG. 6 is a perspective view of the sunshade shelter of FIG. 1 mounted on the child safety seat with an inserted top panel of FIG. 5 to strengthen the structure of the shelter and hold the side panels apart at the top of the sun shelter.
FIG. 6A is a top plan view of the insertable top panel with a hook and loop fastener means for adjusting the width of the panel.
Figure 7:
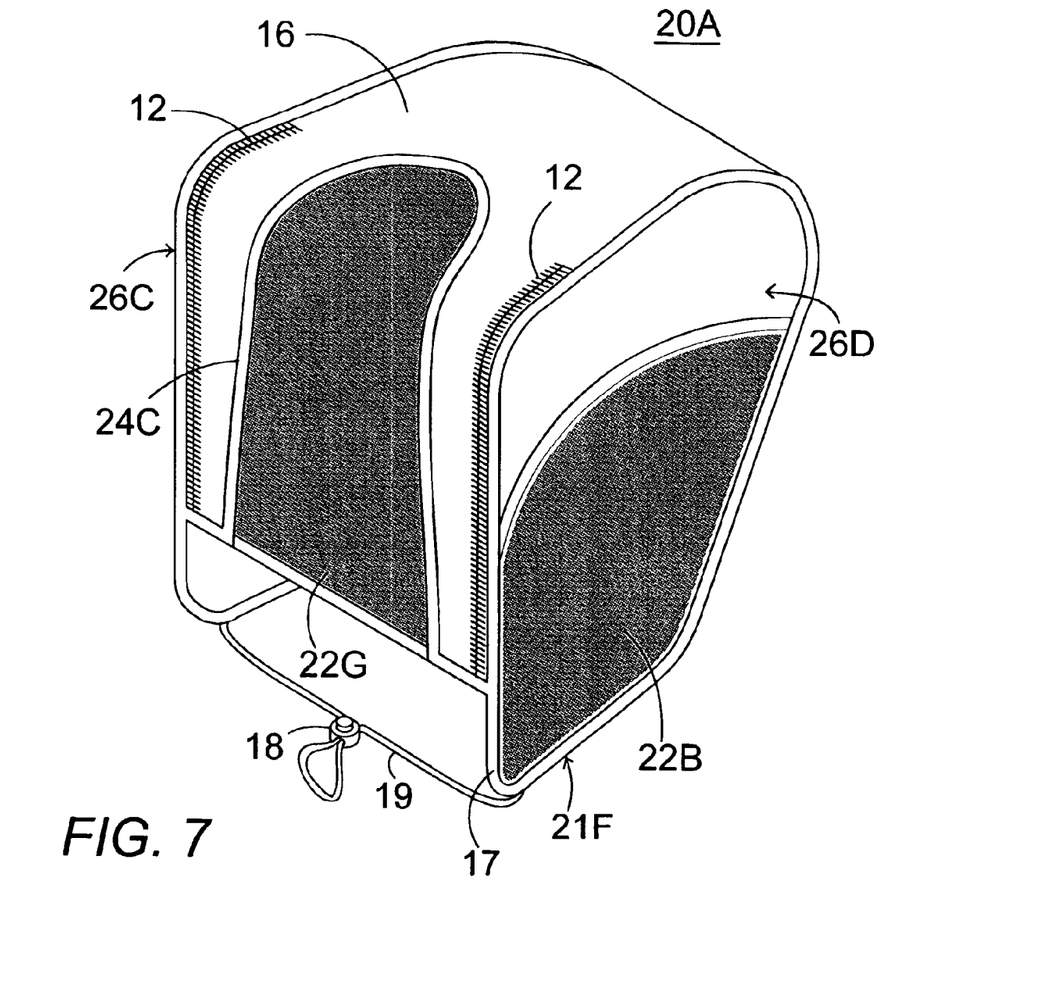
FIG. 7 is a perspective view of a preferred embodiment of the sunshade shelter showing a zippered front panel.

The sunshade shelter device 20 further comprises a top panel having just a tension member frame 21C and 21D, as shown in FIGS. 2, 5 and 6. The tension member 21C and 21D normally assumes the frame configuration. The top panel frame 21D of FIGS. 5 and 6 is adapted for being inserted on top of the shelter device 20 between the pair of side walls 26A and 26B to assist in maintaining the pair of side walls 26A and 26B apart. A binding element 19 is provided that is adapted for binding the top panel frame 21D around a center portion by pulling in two sides of the top panel as shown in FIGS. 5A, 5B, and 5C and thereby expanding the frame 21D on each of the two ends of the top panel frame which contact the side panels, to create an adjustable length top panel frame 21D. The elasticized cord 19 that encircles the middle of the adjustable top panel frame 21D has a cinch means, such as a rigid loop 18 which can be plastic or wood or other material formed in a ring, for tightening the tension on the elasticized cord 19 making the elasticized cord 19 adjustable in tension. In FIG. 6A an alternate binding element means comprises a cord or strap wrapped around the frame with two ends 23A and 23B tied together or connected together with mating hook and loop fasteners 25A and 25B. In FIG. 2 another embodiment of the top panel frame 21C is attached to one side panel 26B and pivots down between the two side panels 26A and 26B.

Figure 8:
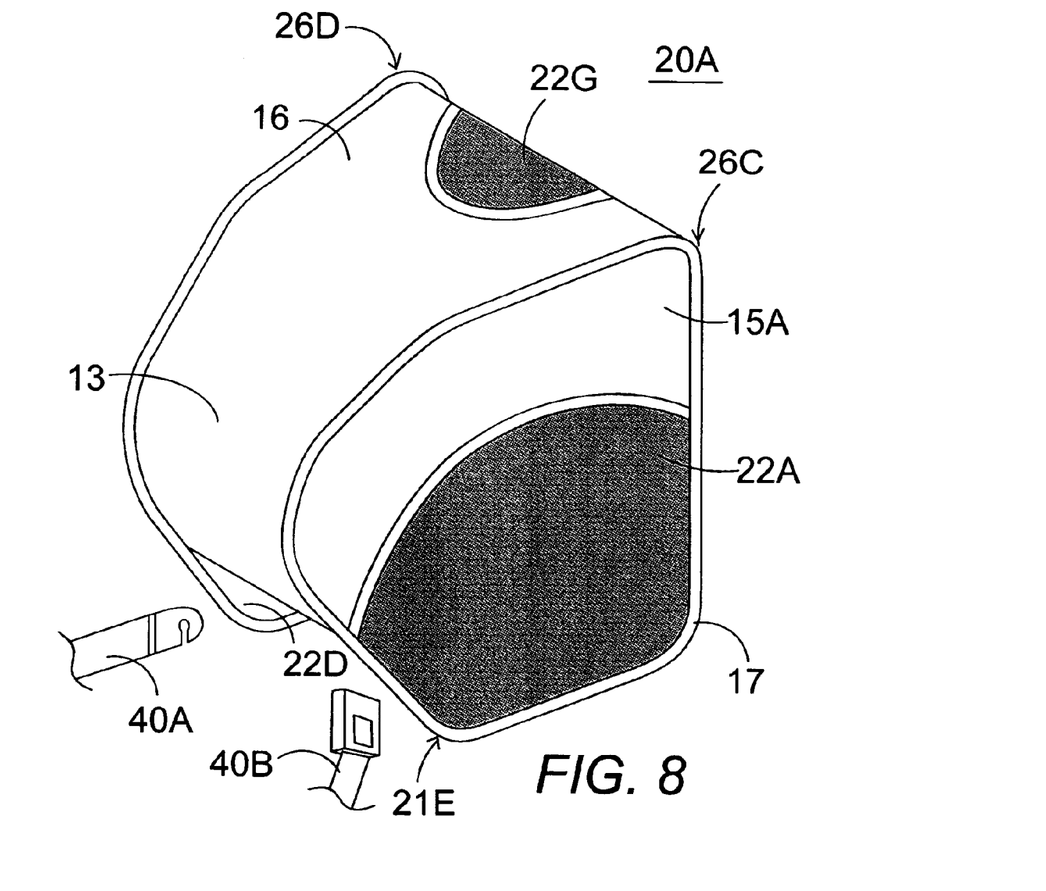
FIG. 8 is a perspective view of the preferred embodiment of the sunshade shelter of FIG. 7 showing side panels angled inwardly toward the back and having a rear extension and showing a partial extension of the top shade fabric to allow a vehicle seatbelt to attach to the back of a child safety seat within the sunshade shelter.
Figure 9:
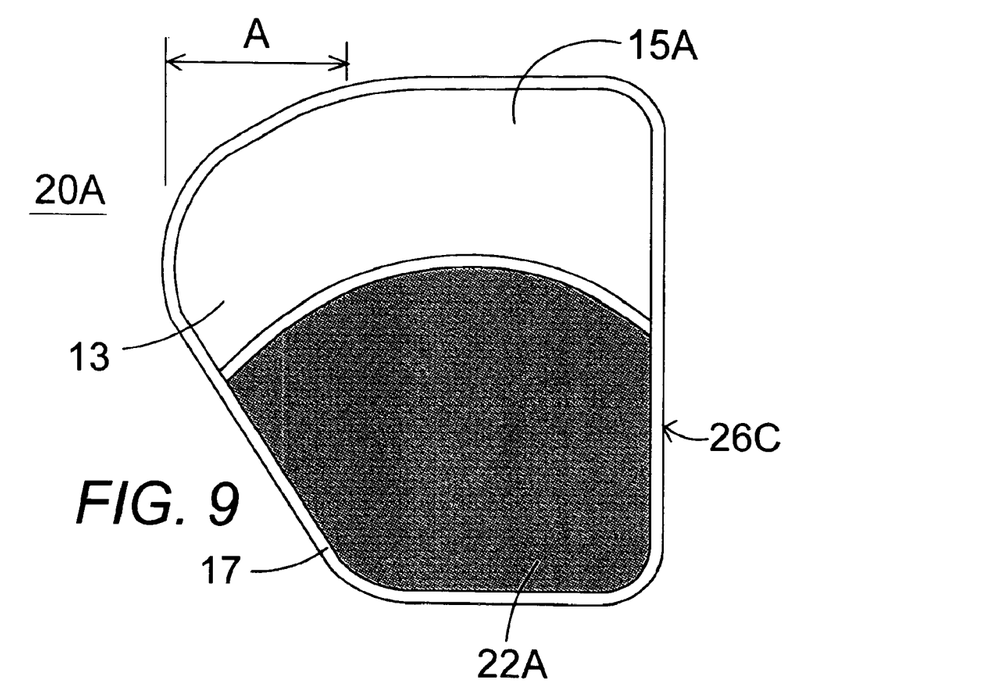
FIG. 9 is a side elevational view of the preferred embodiment of the sunshade shelter of FIG. 7 showing the rear extension of the side panels.
Figure 10:
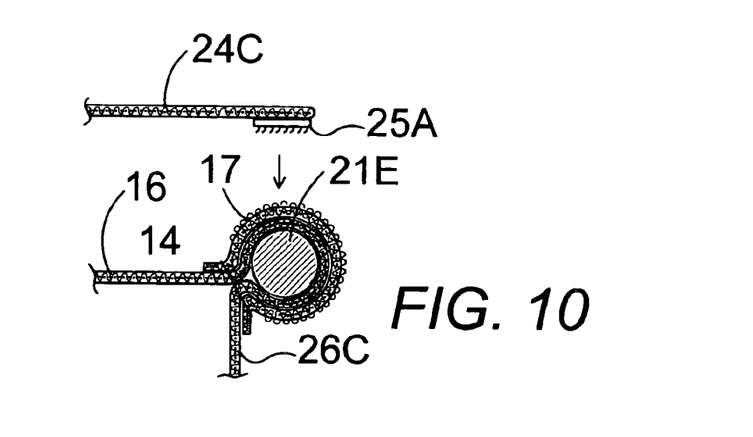
FIG. 10 is a cross-sectional view through one of the frame members showing the loop-type material covering the frame and a hook-type material from the front panel aligned for attachment to the loop-type material.

In the preferred embodiment of the sunshade shelter 20A of FIGS. 7–12, the front shade fabric 24C comprises a front panel formed as an extension of the top shade fabric extending down a substantial portion of the front with a center ventilated sunscreen portion 22G attached to a regular canvas or other type of standard material extending downwardly from the top panel 16. The front panel is attachable to each of the two side panels by a zipper 12 adjacent to each frame 17. In FIG. 8, the sunshade shelter 20A has a partial extension of the top shade fabric 16 down the back to allow a vehicle seatbelt 40A and 40B to attach to the back of a child safety seat within the sunshade shelter As shown in FIG. 10, a connector fabric 17 preferably of a loop-type material receptive to attachment by a Velcro® hook-type material, covers the two side frames. The front panel 24C further comprises a patch of Velcro® hook-type material 25A at of either of the two frames to enable the front panel to be opened to any desired opening size in a variety of differently opening shapes.

Figures 11, 12:
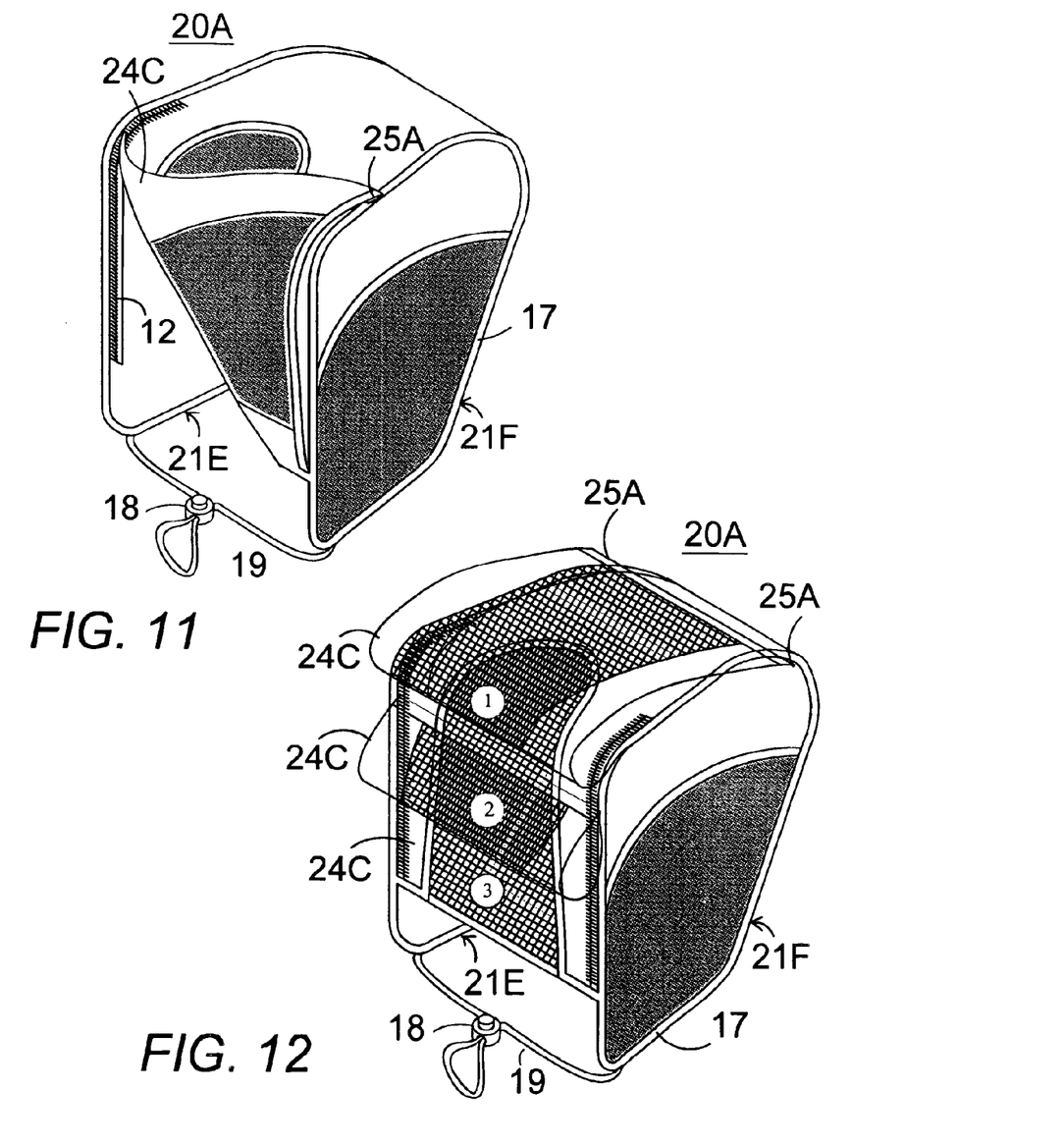
FIG. 11 is a perspective view of the preferred embodiment of the sunshade shelter of FIG. 7 showing a zippered front panel which is unzipped on one side and attached by a bottom corner to the frame on the opposite side from the unzipped side to form an angled opening.
FIG. 12 is a perspective view of the preferred embodiment of the sunshade shelter of FIG. 7 showing a zippered front panel which is unzipped to three varying degrees equally on both zippered sides and attached by both bottom corners of the front panel to the frames above to form any desired size rectangular opening, with three variations shown.

In FIG. 11, one side is unzipped and that corner Velcro® strip 25A attached to the frame 17 on an opposite side for an angled half opening.

In FIG. 12, both sides of the front panel 24C are unzipped and the Velcro® strips 25A attached at various positions on the loop-type material 17 on both frames 21E and 21F so that the front is fully open in position 1 and halfway open in position 2 and fully closed in position 3.

In FIGS. 8, 9, and 10, the side walls 26C and 26D are closer together at the back than at the front. There is also a rear extension 13 of each of the side walls 26C and 26D by a distance A. The extensions 13 are adapted to engage a backrest of a vehicle seat behind a child safety seat so that the rear extensions rest against the vehicle seat backrest causing the two sides of the extensions to bend inward, thereby causing the front of the side walls to bend outward and maintain a maximum front opening.

At least a portion of each of the side shade fabric 22A and 22B and front shade fabric 22G is formed of a breathable screening material.

In practice, a user would first position the sunshade shelter 20 above the child safety seat 30, as shown in FIG. 1, and then lower it down over the car seat 30, as shown in FIG. 2. The user would then secure the two bottom edges of the frames 21A and 21B tightly to each side of the child safety seat 30 by tying together each of the bottom edges of the frames 21A and 21B with the binding element means 19 or 23A and 23B. The top portions of the frames 21A and 21B tend to flex outwardly in response to the pulling inwardly at the bottom edges, thereby maintaining all of the shade fabric 22A–22E in a taut condition to maintain the sunshade shelter 20 around the child safety seat 30.

To strengthen the device 20 a user would insert a top panel frame 21C or 21D on top of the shelter device 20 between the pair of side walls 26A and 26B to assist in maintaining the pair of side walls 26A and 26B apart. A binding element 19 can be used to adjust the length of the top frame 21D.

If needed, the user could attach a front shade fabric to the front of the shelter device 20 to enclose the front of the shelter device 20. In another embodiment a two-paneled front shade 24A and 24B could be attached to the front the shelter 20 fixed to the side panel front edges 27A and 27B. The two panels could overlap and cover the front interconnected by mating hook and loop fasteners 25A and 25B and could also fold back to open the front and be attached to the side panels by mating hook and loop fasteners.

For compact storage, a user would collapse the tension members 21A and 21B by twisting and folding the flexible tension member into a plurality of concentric smaller frames to form a smaller unit for storing. The tension member 21A and 21B is further adapted for expanding open into the frame configuration upon release.

It is understood that the preceding description is given merely by way of illustration and not in limitation of the invention and that various modifications may be made thereto without departing from the spirit of the invention as claimed.

What is claimed is:

1. A sunshade shelter device for child safety seats, the device comprising:
   a pair of side walls adapted for being positioned on each of two sides of a child safety seat, the pair of side walls each comprising a flexible tension member forming a frame for each of the side walls, the tension member normally assuming the frame configuration but adapted for being collapsed by twisting and folding the flexible tension member into a plurality of concentric smaller frames to form a smaller unit for storing, the tension member further adapted for expanding open into the frame configuration upon release;
   a side shade fabric attached to each of the frame around the perimeter of the frame so that the fabric covers the area inside of the frame, the fabric adapted for shading rays of sun so that the frame and covering fabric form a shade wall on each side of the child safety seat;
   a top shade fabric attached to each of the frames along a top portion of the frame and partway down a front portion and a back portion of the frame so that the top shade fabric forms a roof for the shelter;
   a means for securing two bottom edges of the frames tight to the child safety seat on each side of the child safety seat by pulling in each of the bottom edges of the frames so that the top portions of the frames tend to flex outwardly in response to the pulling inwardly at the bottom edges, thereby maintaining all of the shade fabric in a taut condition to maintain a sunshade shelter around the child safety seat;
   wherein the side walls are sufficiently flexible that they may be bent to install a child in and remove a child from the child safety seat with the sunshade shelter in place around the child safety seat; and a front shade fabric adapted for attaching to the front of the shelter device to enclose the front of the shelter device.

2. The sunshade shelter device of claim 1 wherein the front shade fabric comprises a front panel formed as an extension of the top shade fabric extending down a substantial portion of the front, the front panel being removable attachable to each of the two side panels by a zipper.

3. The sunshade shelter device of claim 2 further comprising a connector fabric covering the two side frames, the connector fabric adapted for being attachable one-half of a hook and loop type fastener, and the front panel further comprises a patch at each bottom front corner of the mating half of the hook and loop type fastener so that each of the bottom corners of the front panel is attachable anywhere along the length of either of the two frames to enable the front panel to be opened to any desired opening size in a variety of differently opening shapes.

4. The sunshade shelter device of claim 1 wherein the front shade fabric comprises a single sheet of flexible front shade fabric attached to a front portion of the top shade fabric by a mating hook and loop fastener means.

5. The sunshade shelter device of claim 1 wherein the front shade fabric comprises two sheets of flexible front shade fabric with one sheet attached to a front side of one of the side frames and the other sheet attached to a front side of the other of the side frames, the two sheets adapted for overlapping and being attached together to enclose the front of the shelter device and alternately adapted for being pulled back away from the front of the shelter device to attach to the sides with mating hook and loop fastener means.

6. The sunshade shelter device of claim 5 wherein the overlapping sheets of the front shade fabric are attached together by a mating hook and loop fastener means.

7. The sunshade shelter device of claim 1 wherein the means for securing two bottom edges of the frames tight to the child safety seat comprises an elongated element attached between the two bottom edges of the frame.

8. The sunshade shelter device of claim 7 wherein the elongated element comprises a tie string.

9. The sunshade shelter device of claim 7 wherein the elongated element comprises an elasticized cord.

10. The sunshade shelter device of claim 9 further comprising a binding element means for tightening the tension on the elasticized cord making the elasticized cord adjustable in tension.

11. The sunshade shelter device of claim 7 wherein the elongated element comprises a pair of straps that attach together by mating hook and loop fastener means.

12. The sunshade shelter device of claim 1 wherein the flexible tension member comprises a metal loop.

13. The sunshade shelter device of claim 1 wherein the flexible tension member comprises a plastic loop.

14. The sunshade shelter device of claim 1 wherein the flexible tension member comprises a composite material loop.

15. The sunshade shelter device of claim 1 wherein the side walls are closer together at the back than at the front and further comprising a top rear extension of each of the side walls adapted to engage a backrest of a vehicle seat behind a child safety seat so that the rear extensions rest against a vehicle seat backrest causing the two sides of the extensions to bend inward, thereby causing the front of the side walls to bend outward and maintain a maximum front opening with the top shade fabric held flat in tension between the two side panels.

16. The sunshade shelter device of claim 1 wherein at least a portion of each of the side shade fabric and front shade fabric is formed of a breathable screening material.

17. A sunshade shelter device for child safety seats, the device comprising:
a pair of side walls adapted for being positioned on each of two sides of a child safety seat, the pair of side walls each comprising a flexible tension member forming a frame for each of the side walls, the tension member normally assuming the frame configuration but adapted for being collapsed by twisting and folding the flexible tension member into a plurality of concentric smaller frames to form a smaller unit for storing, the tension member further adapted for expanding open into the frame configuration upon release;
a side shade fabric attached to each of the frame around the perimeter of the frame so that the fabric covers the area inside of the frame, the fabric adapted for shading rays of sun so that the frame and covering fabric form a shade wall on each side of the child safety seat;
a top shade fabric attached to each of the frames along a top portion of the frame and partway down a front portion and a back portion of the frame so that the top shade fabric forms a roof for the shelter;
a means for securing two bottom edges of the frames tight to the child safety seat on each side of the child safety seat by pulling in each of the bottom edges of the frames so that the top portions of the frames tend to flex outwardly in response to the pulling inwardly at the bottom edges, thereby maintaining all of the shade fabric in a taut condition to maintain a sunshade shelter around the child safety seat;
wherein the side walls are sufficiently flexible that they may be bent to install a child in and remove a child from the child safety seat with the sunshade shelter in place around the child safety seat; and
a top panel comprising a flexible tension member forming a frame, the tension member normally assuming the frame configuration and a top panel shade fabric attached to the frame around the perimeter of the frame so that the fabric covers the area inside of the frame, the top panel adapted for being inserted on top of the shelter device between the pair of side walls to assist in maintaining the pair of side walls apart, the top panel adapted for being collapsed by twisting and folding the flexible tension member into a plurality of concentric smaller frames to form a smaller unit for storing, the tension member further adapted for expanding open into the frame configuration upon release.

18. A sunshade shelter device for child safety seats, the device comprising:
a pair of side walls adapted for being positioned on each of two sides of a child safety seat, the pair of side walls each comprising a flexible tension member forming a frame for each of the side walls, the tension member normally assuming the frame configuration but adapted for being collapsed by twisting and folding the flexible tension member into a plurality of concentric smaller frames to form a smaller unit for storing, the tension member further adapted for expanding open into the frame configuration upon release;
a side shade fabric attached to each of the frame around the perimeter of the frame so that the fabric covers the area inside of the frame, the fabric adapted for shading rays of sun so that the frame and covering fabric form a shade wall on each side of the child safety seat;
a top shade fabric attached to each of the frames along a top portion of the frame and partway down a front portion and a back portion of the frame so that the top shade fabric forms a roof for the shelter;

a means for securing two bottom edges of the frames tight to the child safety seat on each side of the child safety seat by pulling in each of the bottom edges of the frames so that the top portions of the frames tend to flex outwardly in response to the pulling inwardly at the bottom edges, thereby maintaining all of the shade fabric in a taut condition to maintain a sunshade shelter around the child safety seat;

wherein the side walls are sufficiently flexible that they may be bent to install a child in and remove a child from the child safety seat with the sunshade shelter in place around the child safety seat; and a top frame comprising a flexible tension member forming a frame, the tension member normally assuming the frame configuration, the top frame adapted for being inserted on top of the shelter device between the pair of side walls to assist in maintaining the pair of side walls apart and further comprising a binding element adapted for binding the top frame around a center portion by pulling in two sides of the top frame and thereby expanding the frame on each of the two ends of the top frame thereby lengthening the top frame to create an adjustable length top frame, the top frame adapted for being collapsed by twisting and folding the flexible tension member into a plurality of concentric smaller frames to form a smaller unit for storing, the tension member further adapted for expanding open into the frame configuration upon release.

19. The sunshade shelter device of claim 18 wherein the binding element comprises an elasticized cord.

20. The sunshade shelter device of claim 19 wherein the elasticized cord that encircles the middle of the adjustable top frame has a binding element means for tightening the tension on the elasticized cord making the elasticized cord adjustable in tension.

21. The sunshade shelter device of claim 18 wherein the binding element comprises a pair of straps that attach together by mating hook and loop fastener means.

22. The sunshade shelter device of claim 18 wherein the binding element comprises a tie cord.

* * * * *